United States Patent
Hejl (10) Patent No.: US 9,094,667 B1
(45) Date of Patent: Jul. 28, 2015

(54) ENCODING OF COMPUTER-GENERATED VIDEO CONTENT

(71) Applicant: Electronic Arts Inc., Redwood City, CA (US)

(72) Inventor: Jim Hejl, Redwood City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 14/068,268

(22) Filed: Oct. 31, 2013

(51) Int. Cl.
 *H04N 19/00* (2014.01)
 *H04N 19/51* (2014.01)
 *H04N 19/13* (2014.01)
 *H04N 19/20* (2014.01)
 *H04N 19/583* (2014.01)

(52) U.S. Cl.
 CPC ... *H04N 19/00696* (2013.01); *H04N 19/00121* (2013.01); *H04N 19/00387* (2013.01); *H04N 19/00733* (2013.01)

(58) Field of Classification Search
 USPC .......................................................... 375/240
 See application file for complete search history.

(56) References Cited

U.S. PATENT DOCUMENTS

| | | | | |
|---|---|---|---|---|
| 6,088,392 A * | 7/2000 | Rosenberg | | 375/240.03 |
| 6,330,281 B1 * | 12/2001 | Mann et al. | | 375/240.12 |
| 6,757,441 B1 * | 6/2004 | Katayama et al. | | 382/248 |
| 7,103,103 B2 * | 9/2006 | Prakash et al. | | 375/240.25 |
| 7,139,317 B2 * | 11/2006 | Prakash et al. | | 375/240.25 |
| 8,605,945 B2 * | 12/2013 | El-Maleh et al. | | 382/103 |
| 2006/0153304 A1 * | 7/2006 | Prakash et al. | | 375/240.25 |
| 2006/0203906 A1 * | 9/2006 | Divorra Escoda et al. | | 375/240.03 |
| 2006/0256852 A1 * | 11/2006 | Prakash et al. | | 375/240.01 |
| 2009/0141809 A1 * | 6/2009 | Visharam et al. | | 375/240.25 |
| 2009/0141810 A1 * | 6/2009 | Tabatabai et al. | | 375/240.25 |
| 2010/0118959 A1 * | 5/2010 | Lou et al. | | 375/240.16 |
| 2013/0303248 A1 * | 11/2013 | Williams et al. | | 463/6 |

OTHER PUBLICATIONS

Vandergheynst et al, "Efficient image representation by anisotropic refinement in matching pursuit," Proc. of IEEE Int'l. Conf. on Acoustics, Speech and Signal Processing (ICASSP '01), May 7-11, 2001, vol. 3, pp. 1757-1760.*

Cavallaro et al., "Tracking Video Objects in Cluttered Background," IEEE Trans. on Circuits and Systems for Video Technology, vol. 15, No. 4, Apr. 2005, pp. 575-584.*

Chang et al., "Simultaneous Motion Estimation and Segmentation," IEEE Trans. on Image Processing, vol. 6, No. 9, Sep. 1997, pp. 1326-1333.*

(Continued)

*Primary Examiner* — Jay Patel
*Assistant Examiner* — Reza Aghevli
(74) *Attorney, Agent, or Firm* — Lowenstein Sandler LLP (57) ABSTRACT

Systems and methods for encoding computer-generated video content. An example method may comprise: generating, based on a geometric model, a sequence of video frames; determining, based on the geometric model, a plurality of motion vectors, each motion vector corresponding to a macroblock comprising one or more pixels of a video frame of the sequence of video frames; and producing an output bit stream representative of the sequence of video frames, by encoding, using the motion vectors, the sequence of video frames.

19 Claims, 7 Drawing Sheets

(56) References Cited

OTHER PUBLICATIONS

Murali E. Krishnan, E. Gangadharan and Nirmal P. Kumar (2012). H.264 Motion Estimation and Applications, Video Compression, Dr. Amal Punchihewa (Ed.), ISBN: 978-953-51-0422-3, InTech, Available from: http://www.intechopen.com/books/video-compression/h-264-motion-estimation-and-applications.

Yuan Zhao, et al. "CAME: Cloud-Assisted Motion Estimation for Mobile Video Compression and Transmission," NOSSDAV' 12, Jun. 7-8, 2012, Toronto, Ontario, Canada, 6 pages.

\* cited by examiner

ENCODING OF COMPUTER-GENERATED VIDEO CONTENT

TECHNICAL FIELD

The present disclosure is generally related to video content encoding, and is more specifically related to encoding of computer-generated video content.

BACKGROUND

A video content item may be represented by a sequence of frames. Each video frame may comprise a plurality of pixels. The size of the video frame may be referred to as the frame resolution. For example, a standard definition (SD) frame may comprise 720×480 pixels, while a full high definition (FullHD) frame may comprise 1920×1088 pixels. In certain implementations, a pixel may be represented by three elementary color space components (R, G, and B), each component being encoded by a plurality of bits (e.g., 8 bits for consumer applications or 12 bits for high-end applications). Thus, the data rate for a raw FullHD video signal at 30 frames per second may be equal to 1.5 Gbps which may be impractical for storage or transmission.

Video content items may be compressed by exploiting their inherent redundancy and characteristics of human vision. To facilitate interoperability between compression at the video producing source and decompression by a video consuming application, various video encoding standards have been developed, including, e.g., MPEG1, MPEG2, MPEG4, H.261, H.263, and/or H.264.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for encoding of computer-generated video content. A video content item may be represented by a sequence of video frames which may be stored in a memory and/or transmitted to an external system for consumption (e.g., by play-back).

In a sequence of video frames, two types of redundancy may inherently be present: spatial and temporal redundancy. The spatial redundancy may be caused by a similarity between a pixel (group of pixels) and its neighboring pixels in a frame. The temporal redundancy may be caused by relatively slow, as compared to the frame rate, change of the video content between two successive frames. The redundant information may be identified and removed by video compression methods.

In conventional video encoders, the temporal redundancy between a current frame and one or more neighboring reference frames may be identified by inter-frame prediction, or motion estimation. A motion estimating method may compare a current macroblock (a group of neighboring pixels having a pre-defined shape and size) with one or more candidate macroblocks in order to identify, in the reference frame, a reference macroblock that is visually similar to a macroblock of the current frame. The displacement form the location of the current macroblock to that of the best candidate macroblock is called a motion vector. Motion estimation identifies the motion vector that would minimize the inter-frame prediction error (also referred to as "residual"). After finding the best matching candidate macroblock, only the residual needs to be encoded, stored, and transmitted.

For encoding a computer-generated sequence of video frames, the motion vectors may be derived from the information which is extrinsic with respect to the sequence of video frames being encoded. In certain implementations, the motion vectors may be directly evaluated based on the geometric model storing the data for the computer-generated imagery, as described in more details herein below. Directly evaluating the motion vectors, rather estimating their values, may significantly improve the output quality of the video encoder.

The methods described herein may be implemented by hardware (e.g., general purpose and/or specialized processing devices, and/or other devices and associated circuitry), software (e.g., instructions executable by a processing device), or a combination thereof. Various aspects of the methods and systems are described herein by way of examples, rather than by way of limitation.

Figure 1:
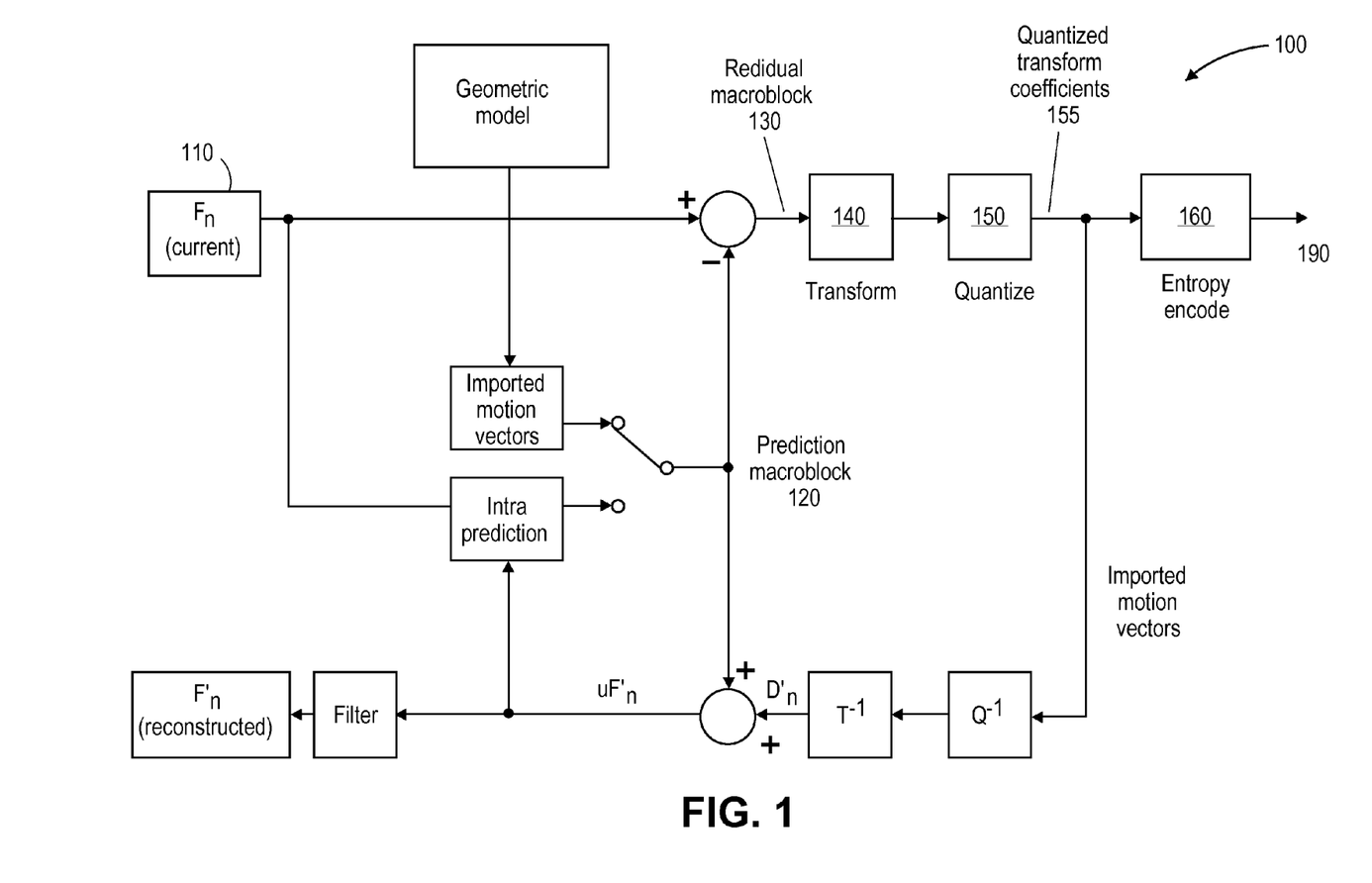
FIG. 1 schematically illustrates a functional block diagram of an example video stream encoder 100 operating in accordance with one or more aspects of the present disclosure.

FIG. 1 schematically illustrates a functional block diagram of an example video stream encoder 100 operating in accordance with one or more aspects of the present disclosure. In certain implementations, the video stream encoder may be compliant with one or more of video encoding standards, including MPEG1, MPEG2, MPEG4, H.261, H.263, and/or H.264.

Video encoder 100 may receive a sequence of video frames, perform compression, and output a bit stream which may be decoded back to a video sequence by a matching video decoder (not shown in FIG. 1). Video encoder 100 may process video frames in macroblocks having a pre-defined size (e.g., 4×4 pixels, 8×8 pixels, and/or 16×16 pixels). As noted herein above, a conventional video encoder may form a prediction of a macroblock based on the previously-coded data, either from the current frame (intra-frame prediction) or from other frames (inter-frame prediction), and then may subtract the prediction from the current macroblock to form a residual. Video encoder 100 operating in accordance with one or more aspects of the present disclosure to encode a computer-generated sequence of video frames, may substitute the motion estimation with directly evaluating the motion vectors based on a geometric model which is employed for generating the sequence of video frames.

As schematically illustrated by FIG. 1, video encoder 100 may process an input frame 110 comprising a plurality of macroblocks. Each macroblock may correspond to an original image fragment of a pre-defined size (e.g., 16×16 pixels). A prediction macroblock 120 may be formed based on either the current frame (intra-frame mode) or motion vectors derived from the 3D model providing the data for the computer-generated sequence of video frames (imported motion vectors mode). In the intra-frame mode, the prediction macroblock 120 may be formed based on samples from the current frame 110. In the imported motion vectors mode, the prediction macroblock 120 may be formed based on the motion vectors derived from the geometric model providing the data for generating the sequence of video frames, as described in more details herein below.

The prediction macroblock P may be subtracted from the current macroblock to produce a residual macroblock 130. The latter may then be transformed using a discrete cosine transform 140 and quantized by block 150 to produce a set of quantized transform coefficients 155. These coefficients may then be ordered and entropy-encoded 160. The entropy-encoded coefficients, together with other information required to decode the macroblock (such as the prediction mode, quantizer step size, motion vector information, etc.) may form the compressed bit stream 190 which may be stored in a memory and/or transmitted to an external system for consumption.

Computer-generated imagery (CGI) may be created based on various geometric models. A simulated object may be represented by a finite number of 2D shapes (e.g., polygons) and/or 3D shapes (e.g., polyhedrons) positioned in the object space (also referred to as "model space"). The geometric shapes comprised by the simulated object may have a color, color pattern, and/or texture over their surface. The simulated object may be generated from mathematical models describing the surfaces of the objects and/or from stored images of the objects.

Each of the geometric shapes representing a simulated object may in turn be represented by a plurality of vertices. Each vertex position may be represented as a vector in the object space. A vector $<x, y, z>$ may be represented in a four-component form referred to as homogeneous coordinates $<x, y, z, w>$. Mathematically, the w value is the value by which x, y, and z components may be divided to produce the conventional 3D (non-homogeneous) position:

$$<x/w, y/w, z/w, 1> = <x, y, z, w>$$

Expressing vertex positions in homogeneous coordinates facilitates various transformations of the underlying model.

The object space provides no spatial relationship between the given object and other objects within a simulated scene. The absolute reference point for all the objects within the scene may be provided by an arbitrarily chosen world space coordinate system. An object specified in the corresponding object space may be positioned within the world space by means of one or more modeling transforms specifying, e.g., rotation and/or scaling of the object.

Another coordinate system that may be employed in a geometric model is the view space, having the origin at a fictitious observer's eye. World-space positions may be converted to view-space positions by the view transform. A transform may be specified by a corresponding matrix in the homogeneous coordinates. Two matrices representing the model and view transform may be combined into a single matrix called the model-view matric.

Another useful transform is the projection transform that defines a segment of the view space where the objects are viewable when rasterized into an image. The matrix defining the projection transform may be referred to as the projection matrix.

The above described coordinate systems and transforms may be used by various object rendering and other related methods. In certain implementations, the geometric model generation and image rendering may be performed simultaneously by a common processing pipeline, e.g., executed by a computing device executing a video gaming application. Alternatively, the image rendering may be performed after the geometric model has been fully generated.

As noted herein above, a computer-generated video content item may be represented by a sequence of image frames. Each frame may be represented by an array of pixels, e.g., by an N-dimensional array of pixel color values, or tuples, such that each item in a tuple corresponds to a color channel. For example, a two-dimensional color image might be represented by a two-dimensional array of pixels, where each pixel is assigned a pixel color of a red-green-blue (RGB) triple, and where each component of the triple is represented by a finite value. Other color spaces might be used, but generally an image is representable by each pixel having a pixel color selected from a color space. Sometimes, these components are referred to as channels, e.g., the red channel, the green channel, the blue channel and the alpha channel. The latter may be used to indicate transparency of the corresponding image element. The color value of a given pixel of the generated image may represent the color of light that would be received through a corresponding opening in a grid placed in a view plane relative to a chosen view point.

In certain implementations, the rendering system may maintain a frame buffer and a Z-buffer (also referred to as a "depth buffer"). The frame buffer may be provided by a two-dimensional array of pixel values. The rendering system may receive the information about the geometric shapes representing the simulated objects. The objects may be ordered by the distance to the chosen view point. Each object may be processed by examining its parameters to determine which pixels the object spans, based on the position of the object in the view space. For each pixel spanned by the object, the corresponding value in the frame buffer may be set to the color of the portion of the object that overlaps that pixel, as schematically illustrated by FIG. 2.

Figure 2:
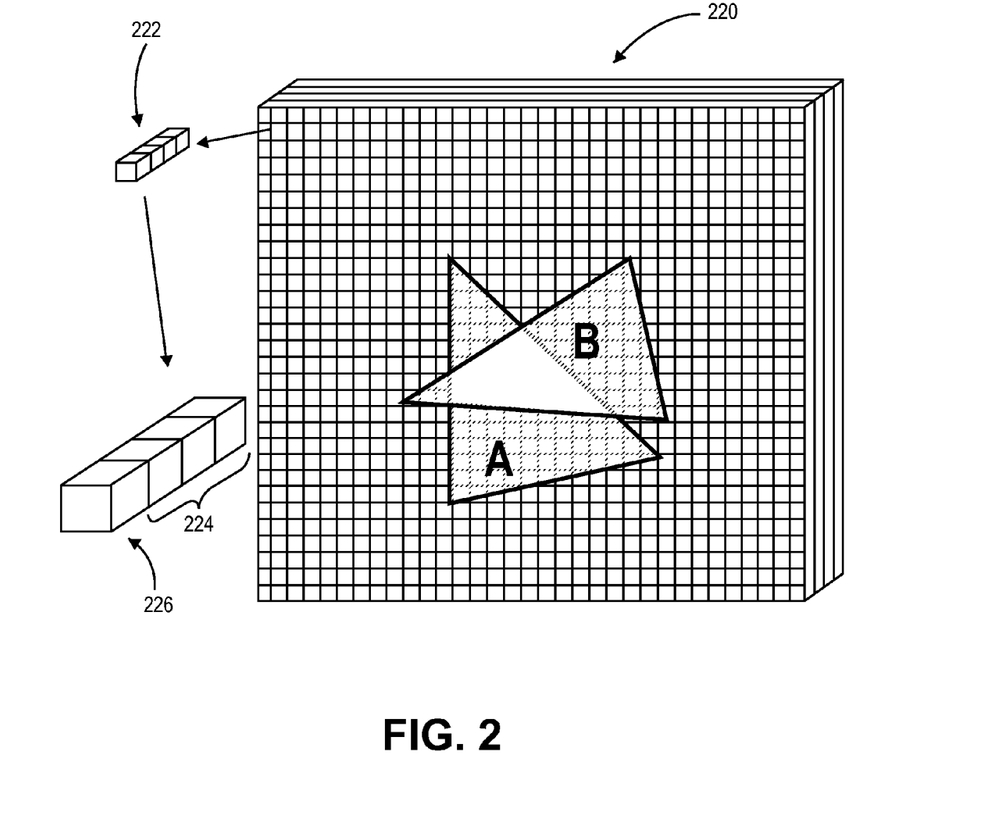
FIGS. 2-3 schematically illustrate examples of frame buffers employed by methods described herein.

In FIG. 2, frame buffer 220 is shown populated with results of processing triangles A and B. One of the frame buffer cells, cell 222, is shown expanded and comprises three color values (red, green, blue) 224 and a transparency value (alpha) 226. The values for most pixels in the frame buffer are blank (or set to a background color, pattern or texture), and some of the cells contain values for one or more objects. Values for more than one object occur, for example, where objects overlap and the closer object has at least some transparency or where an object does not fully cover the pixel's grid opening.

Figure 3:
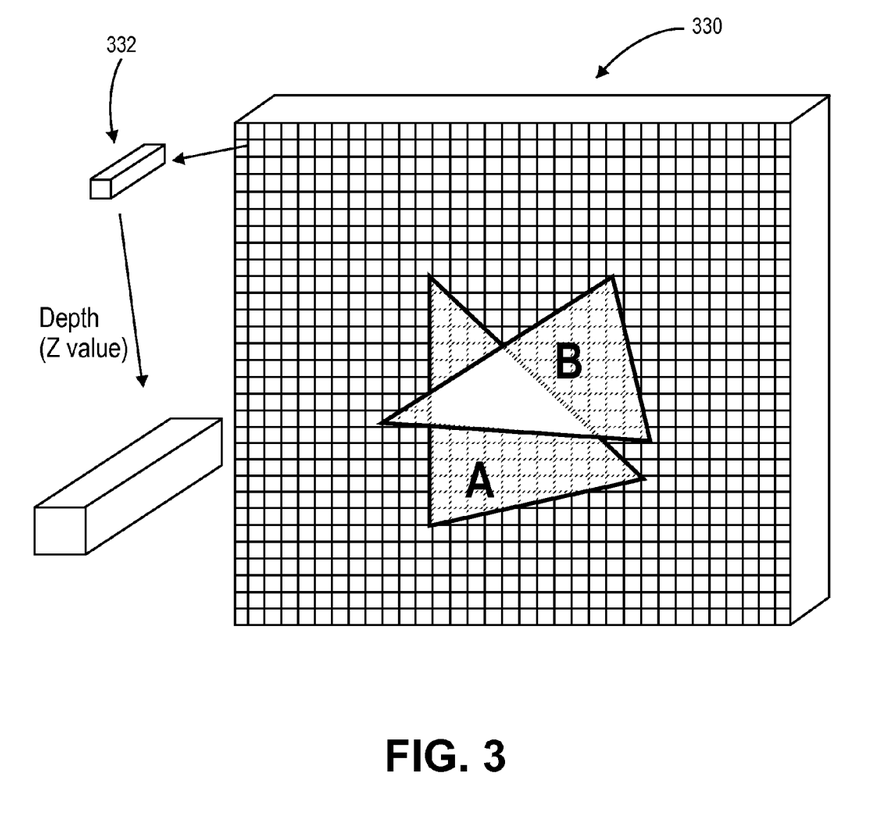

To process overlaps of objects and interaction of a transparent or partially transparent object and the background, the rendering system may store the depth value of the object at each pixel that it spans. In certain implementations, pixel depth values may be stored in Z buffers. As schematically illustrated by FIG. 3, a Z-buffer 330 has cells 332 representing the depth value for the object that is represented by the corresponding color value in the frame buffer. If a pixel within a frame is shared by two or more objects, the rendering system may select the depth value corresponding to the object which is closest to the observer. The selected depth value may be stored in the corresponding position within the Z-buffer.

Figure 4:
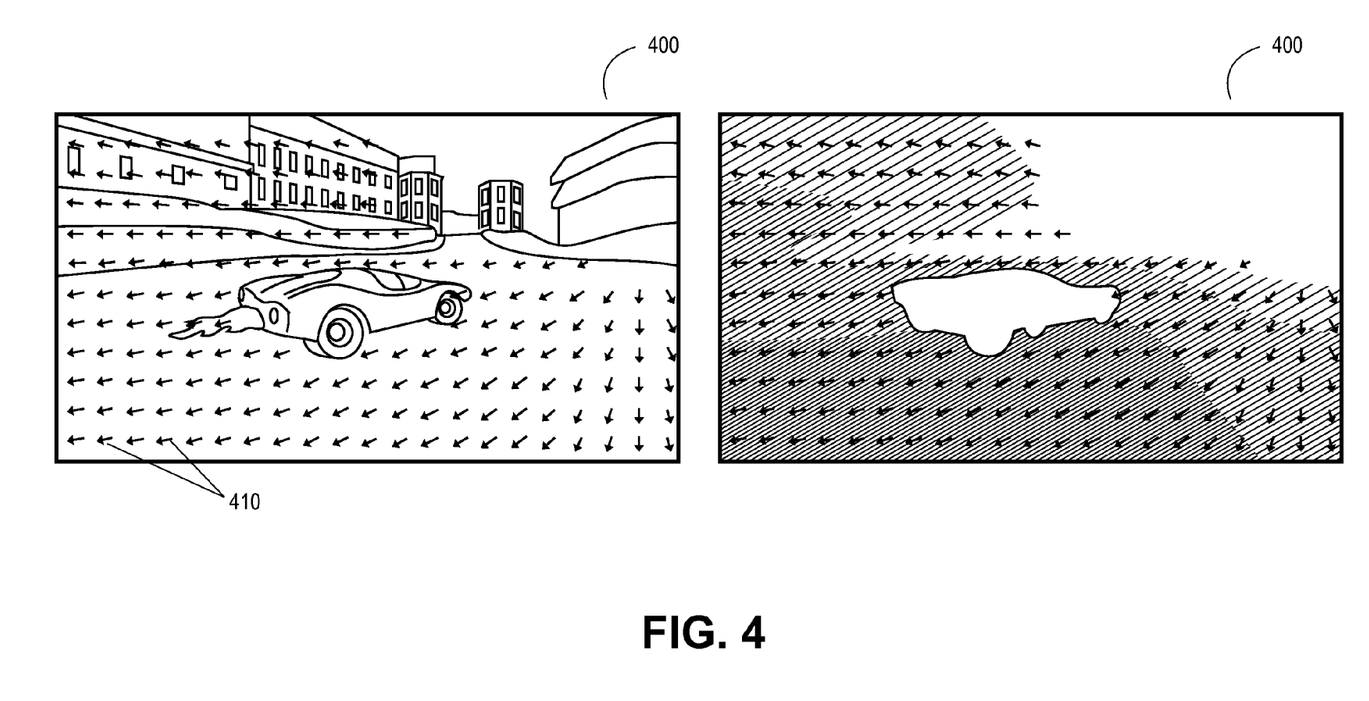
FIG. 4 schematically illustrates a computer-generated video frame and a plurality of motion vectors directly evaluated based on geometric model data.

For each image frame being rendered, the rendering system may evaluate motion vectors for a plurality of macroblocks within the image frame, and feed the motion vectors to a video encoder operating in accordance with one or more aspects of the present disclosure. Each motion vector may represent a displacement form the location of a given macroblock within the current frame relatively to the location of the corresponding macroblock within a neighboring frame (e.g., a previous frame or a successive frame). The corresponding macroblock may be selected as the macroblock that minimizes the inter-frame difference (also referred to as "residual"). The motion vectors may be evaluated by the rendering system based on the geometric model data (e.g., based on the frame buffer data and Z-buffer data). FIG. 4 schematically illustrates a computer-generated video frame 500 and a plurality of motion vectors 410 evaluated by the rendering system based on the geometric model data.

The rendering system may output a sequence of image frames. For each image frame, the rendering system may output a plurality of motion vectors corresponding to a plurality of macroblocks comprised by the frame. In certain implementations, the image rendering and video content encoding may be performed simultaneously, by a common processing pipeline, e.g., executed by a computing device running a video gaming application. Alternatively, the video content encoding may be performed after the image rendering has been fully generated.

In certain implementations, the motion vectors may be derived from a velocity map which may be used, e.g., for producing a motion blur effect. Motion blur is a video effect which may be applied to computer-generated scenes comprising rapidly moving objects. An image produced by a photo or video camera represent the scene over a finite amount of time equal to the exposure period, which is defined by the shutter speed. A computer-generated image may be analogized to an image produced by a camera over an infinitely small exposure period. Thus, a computer-generated sequence of video frames with a frame rate of 25-30 frames per second may not be perceived as visually continuous as natural motion filed at the same frame rate. Hence, the motion blur may be introduced into computer-generated video content (e.g., video games such as especially vehicle simulation games) in order to improve the end user's visual experience. In certain implementations, a motion blur effect may be produced by averaging chosen pixel values within a sequence of frames, wherein the pixel values are selected based on a per-pixel velocity map comprising velocity values for a plurality of pixels within a frame.

In certain implementations, the velocity value for a given pixel may be computed as the difference between the viewport position of the pixel in the current frame and the previous frame. The viewport position herein shall refer to the position of the pixel in the viewport space—that is, the x and y components are in the range of −1 to 1 with the origin (0, 0) at the center of the screen.

The pixel's viewport position may be derived from the world space position, which in turn, may be calculated by using the values stored in Z-buffers. Z-buffer values are the homogenous coordinates of the vertex in the world-view projection:

$$H=(x/w, y/w, z/w, 1)$$

The world space position W of a pixel may be calculated by transforming the homogeneous coordinates of the pixel by the inverse of the current view-projection matrix M and then by multiplying the result by the w component:

$$W=H\times M^{-1}=(x,y,z,w)$$

The previous viewport position of a pixel may be calculated by transforming the world space position of the pixel with the world view projection matrix of the previous frame. Finally, the pixel velocity value may be computed as the difference between the viewport position of the pixel in the current frame and the previous frame.

As noted herein above, the motion vectors to be fed to a video encoder operating in accordance with one or more aspects of the present disclosure may be derived from a per-pixel velocity map. In an illustrative example, the motion vector for a given macroblock may be calculated as the average of the velocity values for the pixels comprised by the macroblock.

Figure 5:
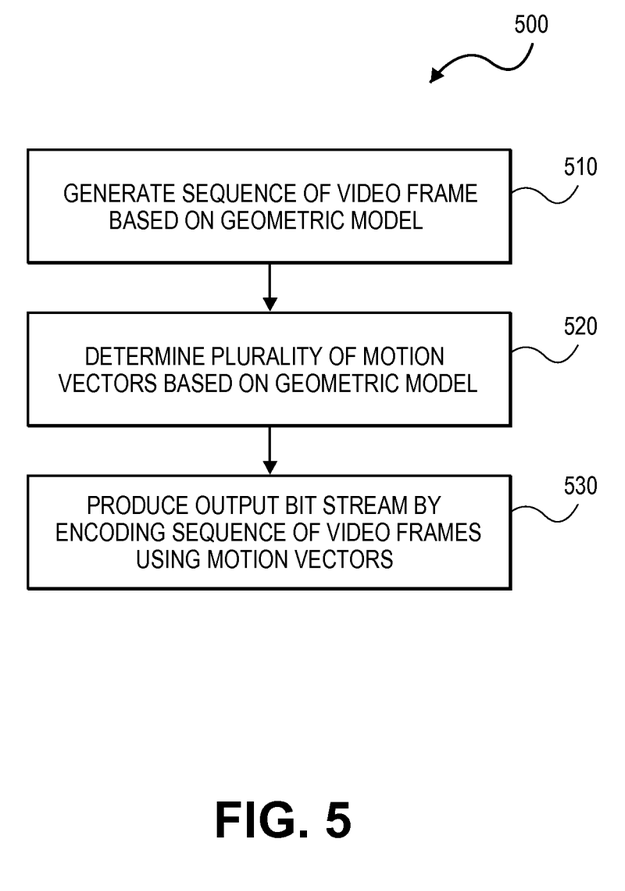
FIG. 5-6 depict flow diagrams of example methods for encoding of computer-generated video content, in accordance with one or more aspects of the present disclosure.

FIG. 5 depicts a flow diagram of an example method 500 for encoding computer-generated video content in accordance with one or more aspects of the present disclosure. Method 500 and/or each of its individual functions, routines, subroutines, or operations may be performed by one or more general purpose and/or specialized processing devices. Two or more functions, routines, subroutines, or operations of method 500 may be performed in parallel or in an order which may differ from the order described above. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. In an illustrative example, method 500 may be performed by computing device 1000 described herein below with references to FIG. 7.

Referring to FIG. 5, at block 510, a computing device may generate, based on a geometric model, a sequence of video frames, as described in more details herein above.

At block 520, the computing device may determine, based on the geometric model, a plurality of motion vectors. Each motion vector may represent a displacement form the location of a given macroblock within the current frame relatively to the location of the corresponding macroblock within a neighboring frame (e.g., a previous frame or a successive frame). The corresponding macroblock may be selected as the macroblock that minimizes the inter-frame difference (also referred to as "residual"). The motion vectors may be evaluated by the rendering system based on the geometric model data (e.g., based on the frame buffer data and Z-buffer data).

In certain implementations, the motion vectors may be derived from a velocity map which may be used, e.g., for producing a motion blur effect. In an illustrative example, the motion vector for a given macroblock may be calculated as the average of the velocity values for the pixels comprised by the macroblock. The velocity value for a given pixel may be computed as the difference between the viewport position of the pixel in the current frame and the previous frame.

At block 530, the computing device may produce an output bit stream representative of the sequence of video frames, by encoding, using the motion vectors, the sequence of video frames. In an illustrative example, encoding the sequence of video frames may comprise the operations described in more details herein below with references to FIG. 6.

Figure 6:
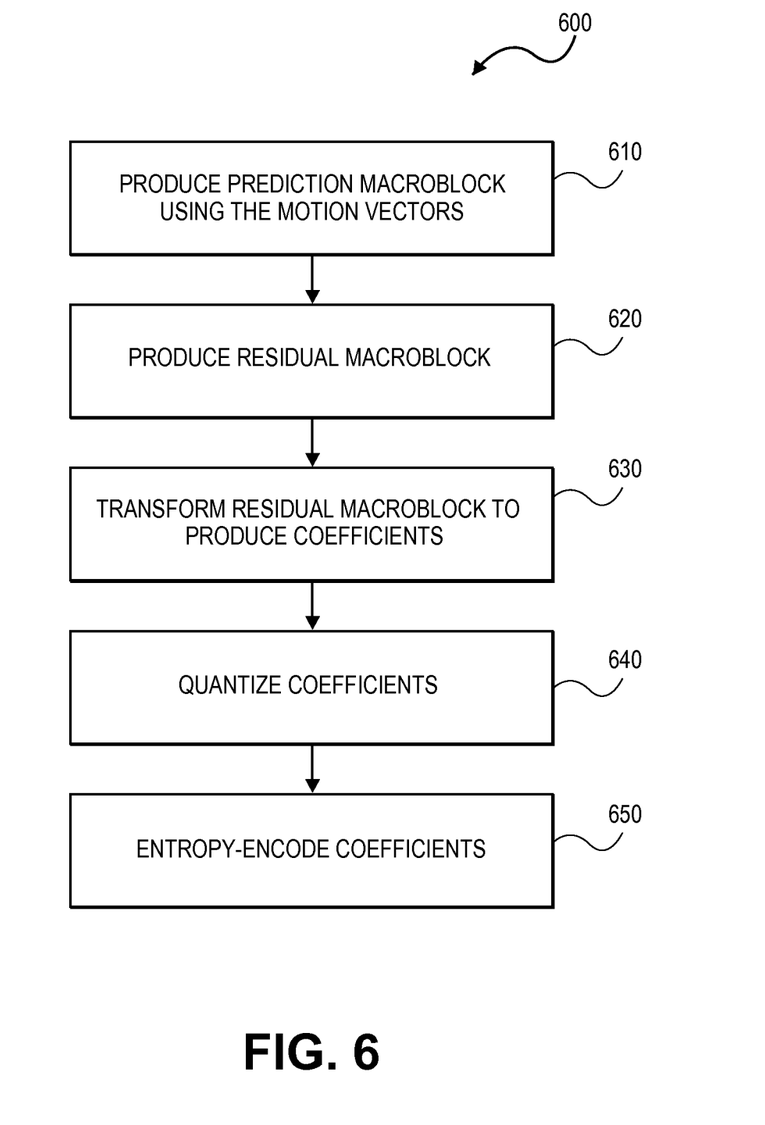

FIG. 6 depicts a flow diagram of an example method 600 for processing an input frame of a sequence of video frames being encoded in accordance with one or more aspects of the present disclosure. Method 600 and/or each of its individual functions, routines, subroutines, or operations may be performed by one or more general purpose and/or specialized processing devices. Two or more functions, routines, subroutines, or operations of method 600 may be performed in parallel or in an order which may differ from the order described above. In certain implementations, method 600 may be performed by a single processing thread. Alternatively, method 600 may be performed by two or more processing threads, each thread executing one or more individual functions, routines, subroutines, or operations of the method.

In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other. In an illustrative example, method 600 may be performed by computing device 1000 described herein below with references to FIG. 7.

At block 610, the computing device may produce a prediction macroblock for a current macroblock using the motion vector corresponding to the current macroblock. In an illustrative example, the prediction macroblock P may be formed based on the motion vectors derived from the geometric model providing the data for generating the sequence of video frames, as described in more details herein above.

At block 620, the computing device may produce a residual based on the prediction macroblock and the current macroblock. In an illustrative example, the prediction macroblock P may be subtracted from the current macroblock to produce a residual macroblock, as described in more details herein above.

At block 630, the computing device may transform the residual by a block transform to produce a plurality of coefficients. The residual represented in the space domain can be converted to a frequency domain by applying a discrete cosine transform (DCT). DCT can be viewed as representing an image block with a weighted sum of pre-defined elementary patterns. The weights are referred to as "coefficients."

At block 640, the computing device may quantize the plurality of coefficients produced by the block transform. In certain implementations, coefficients generated by DCT may carry image components of various frequencies. Since the human vision may be more sensitive to low frequency components, the coefficients may be quantized in order to discard certain less significant bits, by a quantization procedure applying smaller quantization steps to low frequency components.

At block 650, the computing device may perform the entropy-encoding of the plurality of coefficients. The entropy encoding may compress the quantized coefficients and macroblock information into the output bit stream.

Upon completing the operations described with references to block 650, the method may loop back to block 610 to continue processing the input frames.

Figure 7:
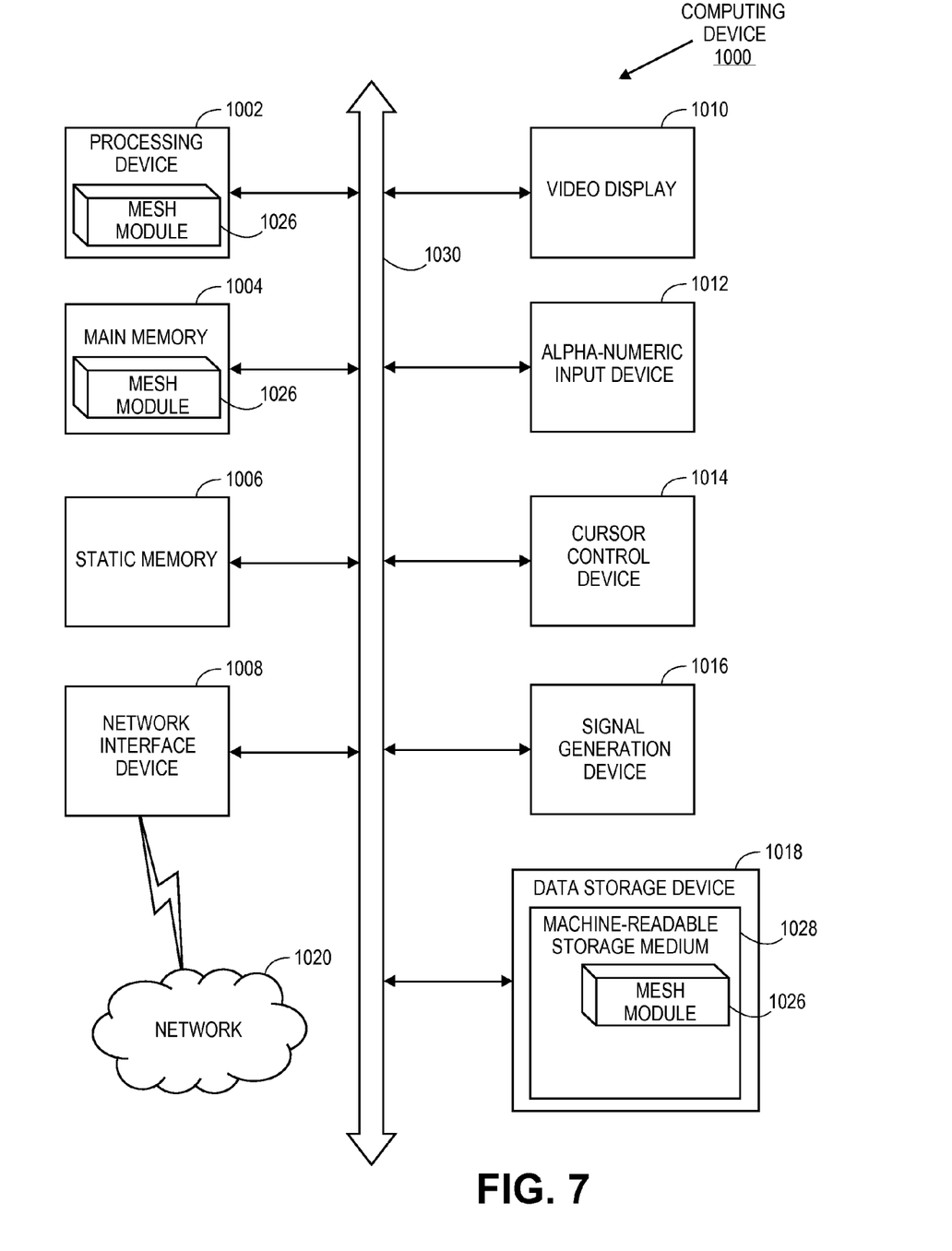
FIG. 7 depicts a block diagram of an illustrative computing device operating in accordance with one or more aspects of the present disclosure.

FIG. 7 illustrates a diagrammatic representation of a computing device 1000 within which a set of instructions, for causing the computing device to perform the methods discussed herein, may be executed. Computing device 1000 may be connected to other computing devices in a LAN, an intranet, an extranet, and/or the Internet. The computing device may operate in the capacity of a server machine in client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1000 may include a processing device (e.g., a general purpose processor) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

Processing device 1002 may be provided by one or more general-purpose processing devices such as a microprocessor, central processing unit, or the like. In an illustrative example, processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1002 may also comprise one or more special-purpose processing devices such as an application specific integrated circuit (ASIC), a field programmable gate array (FPGA), a digital signal processor (DSP), network processor, or the like. The processing device 1002 may be configured to execute methods 500 and/or 600 for encoding computer-generated video content in accordance with one or more aspects of the present disclosure for performing the operations and steps discussed herein.

Computing device 1000 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

Data storage device 1018 may include a computer-readable storage medium 1028 on which may be stored one or more sets of instructions (e.g., instructions of methods 500 and/or 600 for encoding computer-generated video content in accordance with one or more aspects of the present disclosure) implementing any one or more of the methods or functions described herein. Instructions implementing methods 500 and/or 600 may also reside, completely or at least partially, within main memory 1004 and/or within processing device 1002 during execution thereof by computing device 1000, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating", "identifying", "determining", "sending", "assigning", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
    generating, based on a geometric model, a sequence of video frames;
    determining, based on a depth buffer associated with the geometric model, a velocity map comprising a plurality of velocity values for each pixel, each velocity value representing a difference between a viewport position of a pixel in a current frame and a previous frame, wherein the viewport position of the pixel is calculated using a pixel depth value stored in the depth buffer;
    determining, based on the velocity map, a plurality of motion vectors, each motion vector corresponding to a macroblock comprising one or more pixels of a video frame of the sequence of video frames; and
    producing, by a processing device, an output bit stream representative of the sequence of video frames, by encoding, using the motion vectors, the sequence of video frames.

2. The method of claim 1, wherein the determining comprises directly evaluating the plurality of motion vectors.

3. The method of claim 1, wherein the geometric model comprises a definition of an object represented by a finite number of geometric shapes.

4. The method of claim 1, wherein each motion vector of the plurality of motion vectors represents a displacement form a location of a macroblock comprising one or more pixels within a current frame relatively to a location of a corresponding macroblock within a neighboring frame.

5. The method of claim 1, wherein the encoding comprises processing an input frame comprising a plurality of macroblocks.

6. The method of claim 5, wherein the processing further comprises:
    producing a prediction macroblock for a current macroblock using a motion vector corresponding to the current macroblock;
    producing a residual based on the prediction macroblock and the current macroblock;
    transforming the residual by a discrete cosine transform to produce a plurality of coefficients;
    quantizing the plurality of coefficients; and
    entropy-encoding the plurality of coefficients.

7. The method of claim 1, wherein the geometric model comprises a frame buffer comprising a plurality of pixels, each pixel being representative of a color of at least a portion of an object that overlaps the pixel.

8. A system, comprising:
    a memory configured to store a geometric model;
    a processing device, coupled to the memory, configured to:
        generate, based on a depth buffer associated with the geometric model, a sequence of video frames;
        determine, based on the geometric model, a velocity map comprising a plurality of velocity values for each pixel, each velocity value representing a difference between a viewport position of a pixel in a current frame and a previous frame, wherein the viewport position of the pixel is calculated using a pixel depth value stored in the depth buffer;
        determine, based on the velocity map, a plurality of motion vectors, each motion vector corresponding to a macroblock comprising one or more pixels of a video frame of the sequence of video frames; and
        produce an output bit stream representative of the sequence of video frames, by encoding, using the motion vectors, the sequence of video frames.

9. The system of claim 8, wherein the processing device comprises a general purpose processing device and a specialized processing device.

10. The system of claim 9, wherein the specialized processing device is configured to perform the encoding of the sequence of video frames.

11. The system of claim 8, wherein each motion vector of the plurality of motion vectors represents a displacement form a location of a macroblock comprising one or more pixels within a current frame relatively to a location of a corresponding macroblock within a neighboring frame.

12. The system of claim 8, wherein the encoding comprises processing an input frame comprising a plurality of macroblocks.

13. The system of claim 12, wherein the processing further comprises:
    producing a prediction macroblock for a current macroblock using a motion vector corresponding to the current macroblock;
    producing a residual based on the prediction macroblock and the current macroblock;
    transforming the residual by a discrete cosine transform to produce a plurality of coefficients;
    quantizing the plurality of coefficients; and
    entropy-encoding the plurality of coefficients.

14. A computer-readable non-transitory storage medium comprising executable instructions that, when executed by a processing device, cause the processing device to perform operations comprising:
    generating, based on a geometric model, a sequence of video frames;
    determining, based on a depth buffer associated with the geometric model, a velocity map comprising a plurality of velocity values for each pixel, each velocity value representing a difference between a viewport position of a pixel in a current frame and a previous frame, wherein the viewport position of the pixel is calculated using a pixel depth value stored in the depth buffer;
    determining, based on the velocity map, a plurality of motion vectors, each motion vector corresponding to a macroblock comprising one or more pixels of a video frame of the sequence of video frames; and producing, by the processing device, an output bit stream representative of the sequence of video frames, by encoding, using the motion vectors, the sequence of video frames.

15. The computer-readable non-transitory storage medium of claim 14, wherein the geometric model comprises a definition of an object represented by a finite number of geometric shapes.

16. The computer-readable non-transitory storage medium of claim 14, wherein each motion vector of the plurality of motion vectors represents a displacement form a location of a macroblock comprising one or more pixels within a current frame relatively to a location of a corresponding macroblock within a neighboring frame.

17. The computer-readable non-transitory storage medium of claim 14, wherein the encoding comprises processing an input frame comprising a plurality of macroblocks.

18. The computer-readable non-transitory storage medium of claim 14, wherein the processing further comprises:

producing a prediction macroblock for a current macroblock using a motion vector corresponding to the current macroblock;

producing a residual based on the prediction macroblock and the current macroblock;

transforming the residual by a discrete cosine transform to produce a plurality of coefficients;

quantizing the plurality of coefficients; and entropy-encoding the plurality of coefficients.

19. The computer-readable non-transitory storage medium of claim 14, wherein the geometric model comprises a frame buffer comprising a plurality of pixels, each pixel being representative of a color of at least a portion of an object that overlaps the pixel.

* * * * *